Patented Sept. 29, 1942

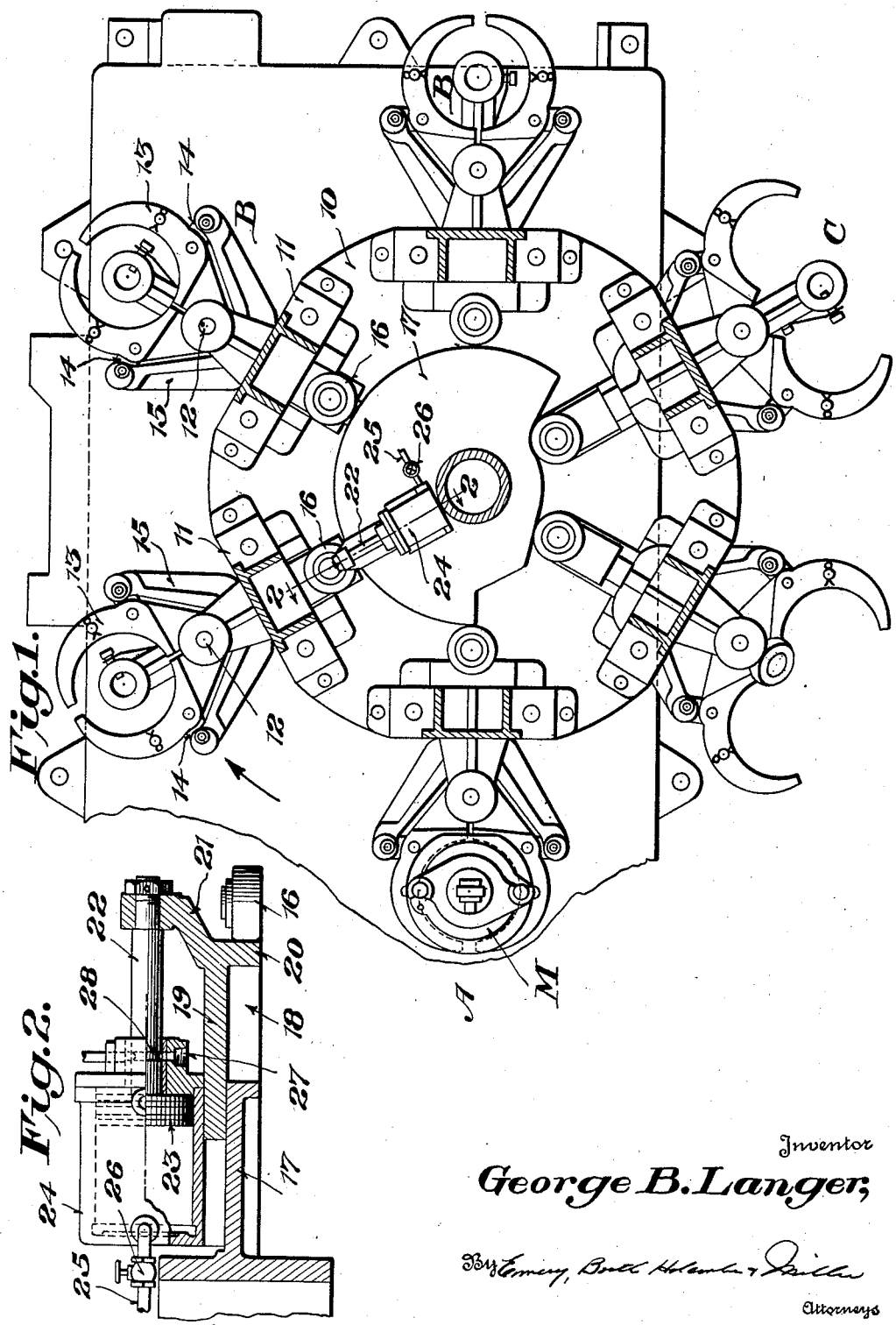

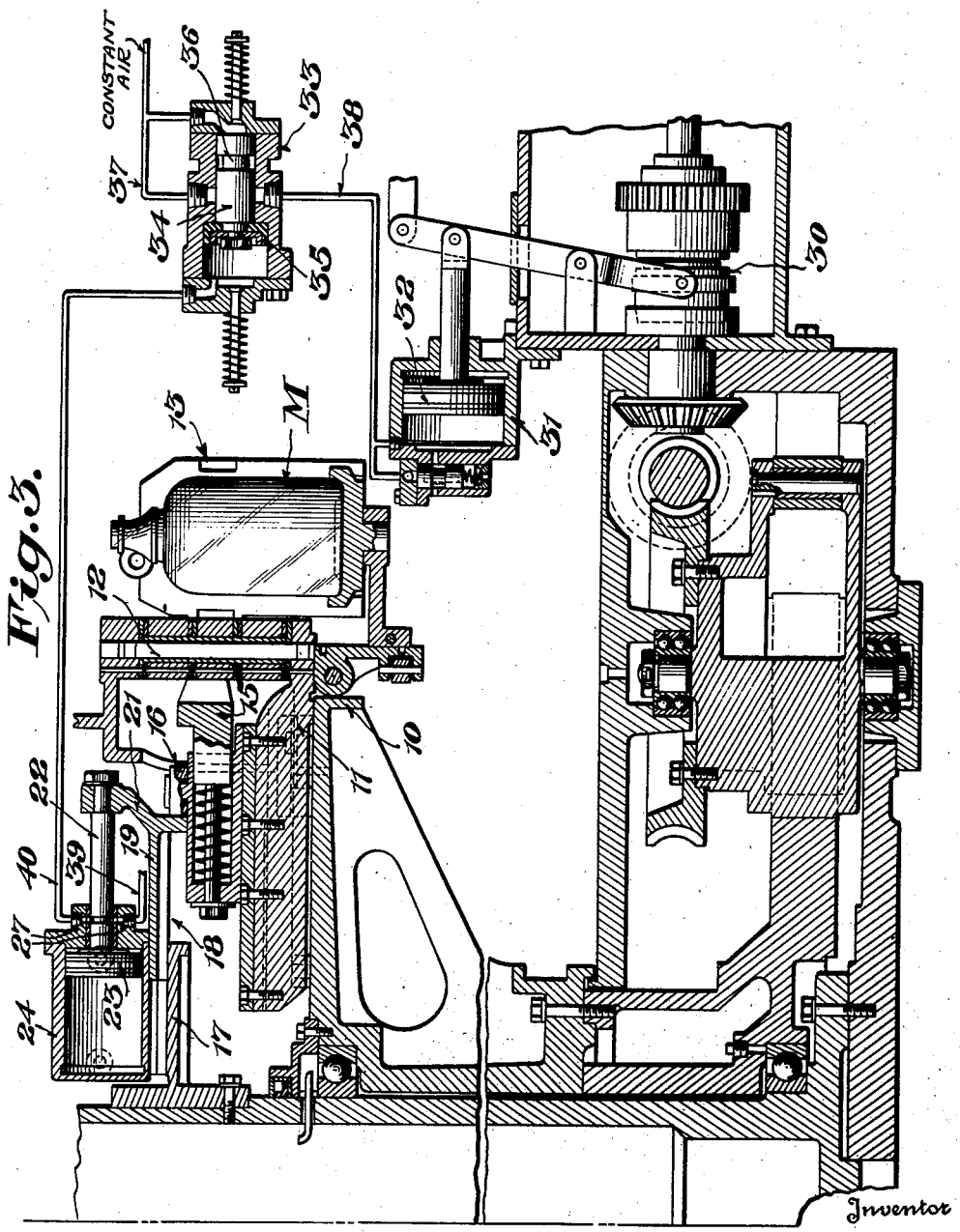

2,296,935

UNITED STATES PATENT OFFICE 2,296,935

GLASSWARE FORMING MACHINE

George B. Langer, Anderson, Ind., assignor to Lynch Corporation, Anderson, Ind., a corporation of Indiana Application February 21, 1940, Serial No. 320,190

9 Claims. (Cl. 49—41)

The present invention relates to improvements in glassware forming machines of the type having a plurality of molds mounted on a rotary mold carrier, and aims generally to improve the construction of the machines whereby the molds may be quickly replaced.

Modern glassware forming machines, such for example of the type disclosed in the patent to Bridges No. 2,049,422, dated August 4, 1936, are designed for the automatic manufacture of a wide range of ware ranging from fractional ounce sizes to gallon sizes. This machine is adapted for the different sizes and types of ware merely by changing the molds. As the machine is necessarily out of production while the molds are being changed, it is of material advantage that changing of the molds be accomplished in as short a time as possible.

In glassware forming machines of the type above described, the mold halves, parison and finishing, are removably carried by mold holders hinged upon a hinge pin. The mold holders and mold sections are normally held in tightly closed position by means of a cam in engagement with a roller carried by the mold links. Obviously the mold halves may only be replaced or changed when the mold holders are in open position, and although the mold closing cam is usually designed to open the molds at certain positions, frequently these positions are not readily accessible to the workman because of other machinery.

The present invention provides means enabling mold changes and replacements to be quickly and readily effected.

More particularly, the invention aims to improve the construction of glassware forming machines permitting the changing of molds at a loading station, at which the molds normally are closed.

In order better to illustrate the invention, reference is made to the accompanying drawings illustrating one embodiment thereof, as applied to a finishing mold carrier of a narrow neck bottle forming machine. In the drawings Fig. 1 is a partial plan view of a finishing mold carrier modified according to the present invention;

Fig. 2 is an enlarged sectional view taken on the line 2—2 of Fig. 1; and

Fig. 3 is a sectional diagrammatic view through the mold carrier, illustrating the driving mechanism for the carrier.

In the illustrated embodiment of the invention a rotary mold carrier 10 is provided with a series of blocks 11 each carrying a vertical hinge pin 12 on which are pivoted sectional mold holders 13 connected by suitable linkages 14 to a slide 15 carrying a roller 16 bearing on the periphery of a mold closing cam 17. The mold carrier 10 is rotated to move the molds successively from a ware receiving or transferring position A, where the molds may be initially closed around the article by suitable mechanism (not shown), through a reheating and final blowing region B to a takeout position C where the ware is removed from the machine. Under normal operating conditions the molds M are held closed by the cam 17 and roller 16 during movement from positions A to C, and the molds are opened only from position C to A. Ordinarily mold changes must be made at some position from C to A but quite frequently this is a difficult task due to the presence of other mechanisms, such as article takeout means, or takeoff conveyor and mold-cooling means.

In rotary forming machines of the type referred to, the final blowing of the article does not take place immediately upon transfer of the ware to the finishing mold. Advantageously an idle or reheating period is provided, and the final blowing may conveniently be started at a position, such as indicated at B. A position between A and B is highly suitable as a loading station for replacement of molds.

According to the present invention this is accomplished by providing the mold-closing cam 17 with a radial slot or guideway 18. A closure plate 19 is replaceably secured to the cam 17 adapted normally to cover the slot 18, and said plate is formed with a depending cam surface 20 adapted to be positioned in the outer end of the guideway 18 and provide a continuation of the peripheral edge of the cam 17 for holding the mold closed under normal operating conditions.

According to a preferred form of the invention, the cover or slide 19 is held outwardly with the depending cam surface 20 in alignment with the peripheral edge of the cam by means of a pneumatic cylinder and piston device. Advantageously the slide has an upwardly extending bearing member 21 in which is secured the forward end of a rod 22, the opposite end of which carries a piston 23 reciprocable in a cylinder 24 secured to the cam plate 17 or other suitable part of the machine. Constant air pressure is exerted on the rear face of the piston 23 by means of air supplied to said cylinder 24 through air line 25, so as normally to hold the part 20 flush with the edge of the cam.

When it is desired to change the molds, the machine of course is stopped and the air pressure may be manually released from the cylinder by operation of the shut-off and exhaust cock 26. The piston 23 may then be pushed back in the cylinder to position the cam lug 20 in the rear of the slot 18 thus permitting the roller 16 to move inwardly in the slot to enable the mold sections M to be fully opened.

The invention contemplates means to prevent rotation of the mold carrier unless the piston 23 and cam lug 20 are fully extended, displacing the roller 16 from the slot 18; otherwise serious damage to the machine would result. This is advantageously accomplished by aligned air ports 27 in the cylinder 24 placed in communication with each other through goove 28 in the piston rod 22, only when the piston rod is in extended position.

Advantageously the machine may be motor driven, the drive including a clutch 30 adapted to be disengaged automatically by means of a safety cylinder 31 and piston 32. A clutch cylinder safety valve 33 has a two diameter bore. A valve stem 34 reciprocates within the smaller bore and carries at one end a piston 35 positioned within the larger bore. Constant or periodic air pressure is applied to the smaller end of the valve stem, normally to place a groove 36 of the stem in communication with aligned ports in the casing to admit contant pressure air from line 37 to line 38 leading to the rear end of clutch cylinder 31 to maintain the clutch disconnected. When, however, the loading station piston 23 is extended as shown in Fig. 3, air under pressure may flow from constant air line 39 to line 40 to the larger diameter bore of valve casing 33, acting upon piston 35 to hold the valve 34 closed and shut off air from the cylinder 31. When air is exhausted from the cylinder, the clutch may be shifted, manually or otherwise, to rotate the machine, but as will be observed the roller 16 has previously been displaced from the slot 18 in the cam 17, so that the mechanism is free to rotate around the cam.

While I have illustrated one form of the invention it is obviously applicable to other types as well as is not to be restricted to the details shown and described, but embraces equivalents within the scope of the appended claims.

I claim:

1. In a glassware forming machine, a rotatable mold carrier, means for rotating said carrier, a plurality of sectional openable molds mounted on said carrier, a cam for holding said molds closed throughout a region of mold travel of said carrier, said cam being provided with a section displaceable to permit the opening of said molds at a selected position in said region of normally closed mold travel, and means for preventing operation of said mold carrier rotating means when a mold at said selected station is opened.

2. In a glassware forming machine, a mold carrier, means for moving said carrier, a plurality of sectional openable molds hingedly mounted on said carrier, a roller carrying linkage connected to said molds for opening and closing them, a stationary cam coacting with said roller for holding said molds closed during a region of mold travel of said carrier, a recess in said cam at a selected position in said region of normally closed mold travel, a member secured to said cam having a part positioned in said recess and constituting a continuation of the cam face, and means permitting the displacement of said part from its operative position in said recess to permit the opening of said molds at said selected position, and means for preventing operation of said mold moving means when said part is displaced from its operative position in said recess.

3. In a glassware forming machine, a mold carrier, means for moving said carrier, a plurality of sectional openable molds hingedly mounted on said carrier, a roller carrying linkage connected to said molds for opening and closing them, a stationary cam coacting with said roller for holding said molds closed during a region of mold travel of said carrier, a recess in said cam at a selected position in said region of normally closed mold travel, a closure member for said cam recess having a part positioned therein and normally constituting a continuation of the cam face, means permitting manual retraction of said part in said recess to permit the linkage roller to be disposed therein and the molds opened at said selected position, and means for preventing operation of said mold moving means when said part is retracted in said recess.

4. In a glassware forming machine, a mold carrier, means for moving said carrier including a clutch controlled shaft, a plurality of sectional openable molds hingedly mounted on said carrier, roller carrying linkage connected to said molds for opening and closing them, a stationary cam coacting with said roller for holding said roller closed during a region of mold travel of said carrier, said cam having a peripheral recess at a selected position in said region of normally closed mold travel, means mounted on said cam having a part positioned in said recess and normally constituting a continuation of the face of said cam, means permitting manual displacement of said part inwardly in said recess to permit said roller to enter said recess to enable the mold to be opened at said selected position, and means for preventing operation of said clutch controlled shaft while said part is displaced inwardly in said recess.

5. In a glassware forming machine, a mold carrier, means for moving said carrier including a clutch controlled shaft, a plurality of sectional openable molds hingedly mounted on said carrier, roller carrying linkage connected to said molds for opening and closing them, a stationary cam coacting with said roller for holding said roller closed during a region of mold travel of said carrier, said cam having a peripheral recess at a selected position in said region of normally closed mold travel, means mounted on said cam having a part positioned in said recess and normally constituting a continuation of the face of said cam, an air cylinder, a piston reciprocable in said air cylinder and connected to said means, means for admitting air to one end of said cylinder to hold said part outwardly in said recess and in continuation of the face of said cam, and means to exhaust the air from said end of the cylinder to permit said part to be displaced inwardly in said recess, allowing the roller to enter said recess to open the molds at said selected position of normally closed mold travel, and means permitting operation of said clutch controlled shaft only when said part is in its outwardly disposed position.

6. In a glassware forming machine, a mold carrier, means for moving said carrier including a clutch controlled shaft, a plurality of sectional openable molds hingedly mounted on said carrier, roller carrying linkage connected to said molds for opening and closing them, a stationary cam coacting with said roller for holding said roller closed during a region of mold travel of said carrier, said cam having a peripheral recess at a selected position in said region of normally closed mold travel, means mounted on said cam having a part positioned in said recess and normally constituting a continuation of the face of said cam, an air cylinder a piston reciprocable in said air cylinder and connected to said means, means for admitting air to one end of said cylinder to hold said part outwardly in said recess and in continuation of the face of said cam, and means to exhaust the air from said end of the cylinder to permit said part to be displaced inwardly in said recess, allowing the roller to enter said recess to open the molds at said selected position of normally closed mold travel, and valve means associated with the cylinder and piston permitting operation of said clutch controlled shaft only when said part is in its outwardly disposed position.

7. In a glassware forming machine, a mold carrier, means for moving said carrier including a clutch controlled shaft, a plurality of sectional openable molds hingedly mounted on said carrier, roller carrying linkage connected to said molds for opening and closing them, a stationary cam coacting with said roller for holding said roller closed during a region of mold travel of said carrier, said cam having a peripheral recess at a selected position in said region of normally closed mold travel, means mounted on said cam having a part positioned in said recess and normally constituting a continuation of the face of said cam, an air cylinder, a piston reciprocable in said air cylinder and connected to said means, means for admitting air to one end of said cylinder to hold said part outwardly in said recess and in continuation of the face of said cam, and means to exhaust the air from said end of the cylinder to permit said part to be displaced inwardly in said recess, allowing the roller to enter said recess to open the molds at said selected position of normally closed mold travel, pneumatically operated means for controlling said clutch controlled shaft, and valve means associated with said cylinder and piston for controlling said pneumatically operated means.

8. A glassware forming machine as defined in claim 1 further characterized in that the displaceable section of the cam is maintained in mold closing position by a fluid pressure operated motor.

9. A glassware forming machine as defined in claim 1 further characterized in that the displaceable section is normally maintained in mold closing position during operation of the machine, but may be manually displaced to permit of opening the molds.

GEORGE B. LANGER.